(12) United States Patent
Kim

(10) Patent No.: US 12,097,749 B2
(45) Date of Patent: Sep. 24, 2024

(54) METHOD FOR CONTROLLING VEHICLE HVAC SYSTEM

(71) Applicants: Hyundai Motor Company, Seoul (KR); Kia Corporation, Seoul (KR)

(72) Inventor: Ki Hyun Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 296 days.

(21) Appl. No.: 17/813,381

(22) Filed: Jul. 19, 2022

(65) Prior Publication Data
US 2023/0158858 A1     May 25, 2023

(30) Foreign Application Priority Data

Nov. 22, 2021   (KR) .................. 10-2021-0161626

(51) Int. Cl.
*B60H 1/00*      (2006.01)
*B60H 1/04*      (2006.01)

(52) U.S. Cl.
CPC ..... *B60H 1/00885* (2013.01); *B60H 1/00278* (2013.01); *B60H 1/00764* (2013.01); *B60H 1/00807* (2013.01); *B60H 1/04* (2013.01); *B60H 2001/00307* (2013.01); *B60H 2001/00928* (2013.01)

(58) Field of Classification Search
CPC ............ B60H 1/00885; B60H 1/00278; B60H 1/00764; B60H 1/00807; B60H 1/04; B60H 2001/00307; B60H 2001/00928; B60H 2001/3258; B60H 1/3211; B60H 1/3204; B60H 1/00457; B60H 1/0073; B60H 1/00735; B60H 1/00878
See application file for complete search history.

(56) References Cited

U.S. PATENT DOCUMENTS

2004/0144106 A1* 7/2004 Douglas .................. F25B 49/02
                                                          62/186

* cited by examiner

*Primary Examiner* — Kun Kai Ma
(74) *Attorney, Agent, or Firm* — Slater Matsil, LLP

(57) ABSTRACT

An embodiment method for controlling a heating, ventilation, and air conditioning (HVAC) system of a vehicle includes determining a target subcooled temperature of a refrigerant based on a temperature and a pressure of the refrigerant discharged from an outlet of a compressor when the compressor operates, calculating a change in enthalpy of the refrigerant based on the determined target subcooled temperature in a process of condensing and subcooling the refrigerant, calculating a change in enthalpy of air passing over an exterior surface of a condenser based on the calculated refrigerant enthalpy change, and calculating a required fan duty of a cooling fan based on the calculated air enthalpy change, wherein the cooling fan is configured to blow the air to the condenser.

20 Claims, 6 Drawing Sheets

METHOD FOR CONTROLLING VEHICLE HVAC SYSTEM

CROSS-REFERENCE TO RELATED APPLICATIONS

This application claims the benefit of Korean Patent Application No. 10-2021-0161626, filed on Nov. 22, 2021, which application is hereby incorporated herein by reference.

TECHNICAL FIELD

The present disclosure relates to a method for controlling a vehicle heating, ventilation, and air conditioning (HVAC) system.

BACKGROUND

It is known to provide heating, ventilation, and air conditioning (HVAC) systems in vehicles. These HVAC systems may heat and cool the air within a passenger compartment for the comfort of occupants. In addition, some vehicle HVAC systems may be configured to selectively change the source of air. In one configuration, the HVAC system draws in fresh air from outside the vehicle, conditions the air, and then circulates the conditioned air into the passenger compartment. In another configuration, the HVAC system draws in a mixture of outdoor air and indoor air, conditions the mixed air, and then pumps the conditioned air into the passenger compartment.

The vehicle HVAC system includes an evaporator, a heater core (or an interior condenser), and an air mixing door within an HVAC housing. The HVAC housing has an inlet through which the air is allowed to be drawn in, and a plurality of outlets through which the air is directed into the passenger compartment. An exterior condenser may be adjacent to a grille in a front compartment of the vehicle, and a refrigerant passing through an internal passage of the exterior condenser may be cooled and condensed by the air drawn in through the grille. A cooling fan may be disposed behind the exterior condenser. The exterior condenser may exchange heat with the air forcibly blown by the cooling fan, and the refrigerant passing through the internal passage of the exterior condenser may be condensed and subcooled. The heater core may heat the air entering the passenger compartment. The air mixing door may be disposed between the evaporator and the heater core. The evaporator may be located upstream of the air mixing door, and the heater core may be located downstream of the air mixing door. The air mixing door may be configured to adjust the flow rate of air passing through the heater core, thereby adjusting the temperature of the air entering the passenger compartment.

The HVAC system may require the subcooling of the refrigerant to prevent the refrigerant in gas phase from flowing into an expansion valve. The HVAC system according to the related art is basically designed to achieve sufficient subcooling of the refrigerant, so an additional control technology for achieving the subcooling of the refrigerant is not applied thereto. Meanwhile, an actual fan duty of the cooling fan may be higher than a required fan duty for the subcooling of the refrigerant, and thus power may be excessively consumed during the operation of the HVAC system.

The above information described in this background section is provided to assist in understanding the background of the inventive concept, and may include any technical concept which is not considered as the prior art that is already known to those skilled in the art.

SUMMARY

The present disclosure relates to a method for controlling a vehicle heating, ventilation, and air conditioning (HVAC) system. Particular embodiments relate to a method for controlling a vehicle HVAC system capable of reducing power consumption and achieving sufficient subcooling of a refrigerant.

Embodiments of the present disclosure can solve problems occurring in the prior art while advantages achieved by the prior art are maintained intact.

An embodiment of the present disclosure provides a method for controlling a vehicle heating, ventilation, and air conditioning (HVAC) system capable of accurately calculating a required fan duty of a cooling fan which matches subcooling of a refrigerant, thereby achieving sufficient subcooling of the refrigerant and reducing power consumption.

According to an embodiment of the present disclosure, a method for controlling a vehicle HVAC system may include determining, by a controller, a target subcooled temperature of a refrigerant based on temperature and pressure of the refrigerant discharged from an outlet of a compressor when the compressor operates, calculating, by the controller, a change in enthalpy of the refrigerant based on the determined target subcooled temperature in a process of condensing and subcooling the refrigerant, calculating, by the controller, a change in enthalpy of air passing over an exterior surface of a condenser based on the calculated refrigerant enthalpy change, and calculating, by the controller, a required fan duty of a cooling fan based on the calculated air enthalpy change. The cooling fan is configured to blow the air to the condenser. The method may be designed to accurately calculate the required fan duty of the cooling fan which matches the subcooling of the refrigerant based on the refrigerant enthalpy change, the air enthalpy change, and the like, thereby achieving sufficient subcooling of the refrigerant and reducing power consumption during the operation of the HVAC system.

The air enthalpy change may be calculated based on a temperature difference between the refrigerant and the air, a specific heat of the air, and a flow rate of the refrigerant.

The method may further include monitoring a vehicle speed and an opening degree of a grille. The required fan duty of the cooling fan may be calculated based on the vehicle speed, the opening degree of the grille, and the calculated air enthalpy change.

The method may further include preliminarily cooling and condensing the refrigerant using a coolant passing through a heat exchanger located on the upstream side of the condenser, and calculating, by the controller, a change in enthalpy of the coolant based on RPM of a pump of a cooling system. The HVAC system may be thermally connected to the cooling system through the heat exchanger, and the required fan duty of the cooling fan may be calculated based on the calculated coolant enthalpy change and the calculated air enthalpy change.

The coolant enthalpy change may be calculated based on a higher RPM of a first RPM determined by an external controller and a second RPM determined by the controller. As the coolant enthalpy change is calculated based on the higher RPM of the first RPM and the second RPM and the flow rate of the coolant passing through the heat exchanger increases, the amount of the refrigerant condensed by the heat exchanger may be relatively increased compared to the amount of the refrigerant condensed by the condenser, and thus the required fan duty of the cooling fan for the sub-cooling of the refrigerant may be relatively reduced.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
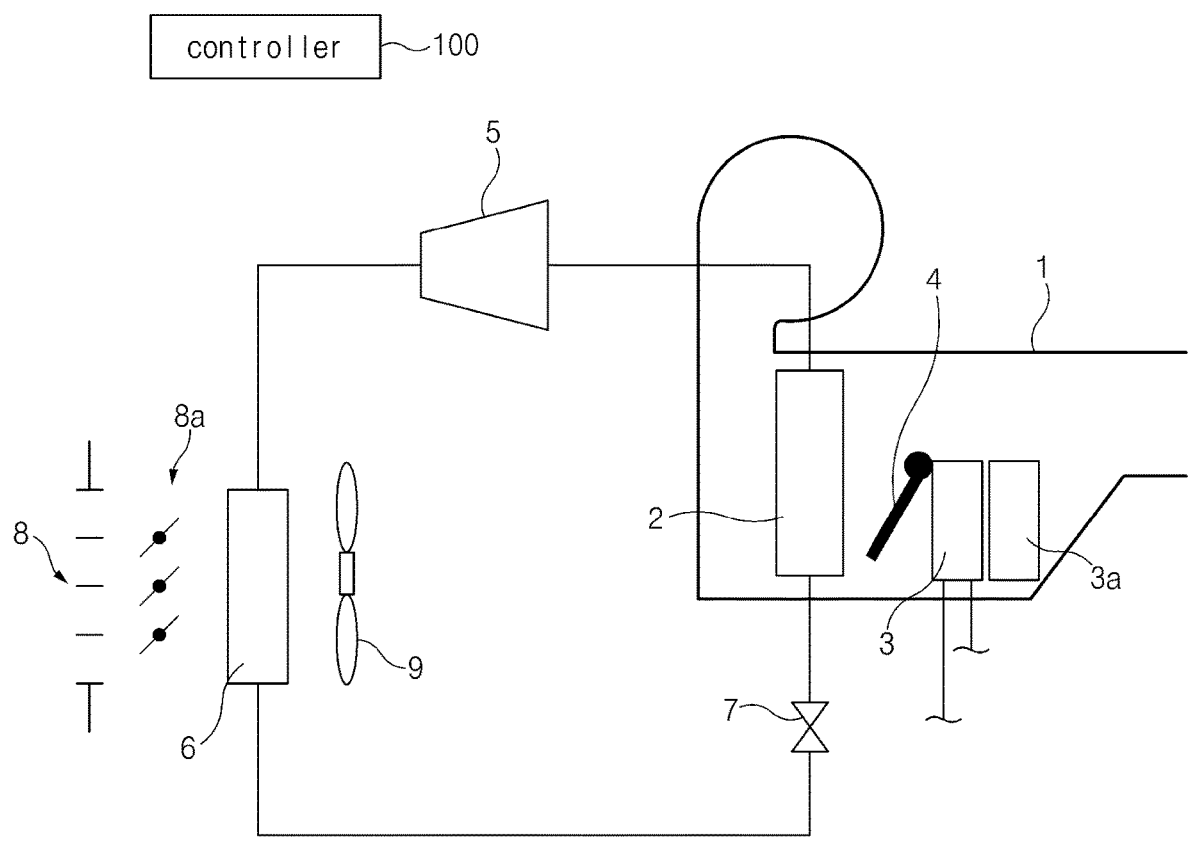
FIG. 1 illustrates an example of a heating, ventilation, and air conditioning (HVAC) system, which is applicable to an internal combustion engine vehicle.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 illustrates an example of a heating, ventilation, and air conditioning (HVAC) system, which is applicable to an internal combustion engine vehicle. Referring to FIG. 1, a vehicle HVAC system according to an exemplary embodiment of the present disclosure may include an HVAC housing 1. The HVAC housing 1 may be mounted on a dash panel of the vehicle by which a front compartment and a passenger compartment are divided.

The HVAC housing 1 may accommodate an evaporator 2, a heater core 3, and an air mixing door 4. The evaporator 2, the air mixing door 4, and the heater core 3 may be sequentially arranged within the HVAC housing 1 in an air flow direction from upstream to downstream.

The HVAC housing 1 may include an inlet through which the air is allowed to be drawn in, and an outlet through which the air is directed into the passenger compartment.

The evaporator 2 may be located upstream in the HVAC housing 1, and the evaporator 2 may be configured to cool the air. An expansion valve 7 may be connected to an inlet of the evaporator 2, and a compressor 5 may be connected to an outlet of the evaporator 2. A condenser 6 may be connected to an outlet of the compressor 5. A refrigerant loop may connect the compressor 5, the condenser 6, the expansion valve 7, and the evaporator 2, and a refrigerant may circulate through the refrigerant loop.

The condenser 6 may be adjacent to a grille 8 of the vehicle, and a cooling fan 9 may be located behind the condenser 6. The refrigerant passing through an internal passage of the condenser 6 may be cooled by the air forcibly blown by the cooling fan 9, and accordingly the refrigerant may be condensed and subcooled while passing through the internal passage of the condenser 6.

According to an exemplary embodiment, an active air flap 8a may be configured to adjust the opening degree of the grille 8, and the active air flap 8a may be disposed between the grille 8 and the condenser 6. Each flap of the active air flap 8a may be rotatable to thereby adjust the opening degree of a corresponding opening of the grille 8.

The heater core 3 may be located on the downstream side of the evaporator 2, and the heater core 3 may be configured to heat the air. According to an exemplary embodiment, the heater core 3 may heat the air using an engine coolant heated by an engine. According to another exemplary embodiment, a coolant may be heated by waste heat generated when power electronics such as a motor, a power converter (an inverter, a converter, etc.), an on-board charger (OBC), and an automated driving controller are operating, and the heater core 3 may heat the air using the coolant heated by the waste heat. According to another exemplary embodiment, the heater core 3 may be configured to heat the air using a refrigerant compressed by a heating operation (heat pump function) of a refrigeration cycle. A positive temperature coefficient (PTC) heater 3a may be located on the downstream side of the heater core 3.

A controller 100 may be configured to control the compressor 5, the cooling fan 9, and the like.

Figure 2:
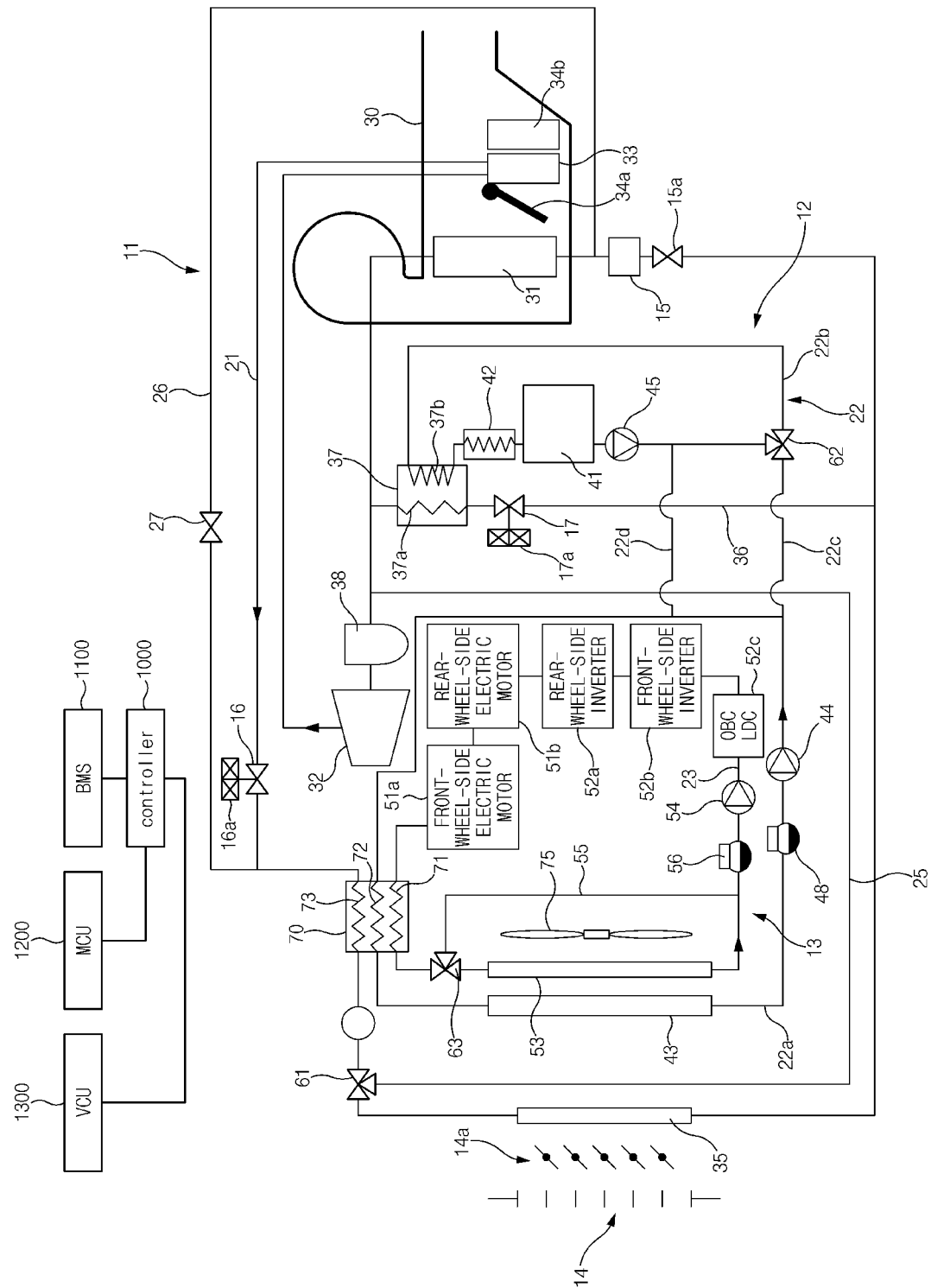
FIG. 2 illustrates an example of an HVAC system, which is applicable to an electric vehicle.

FIG. 2 illustrates an example of an HVAC system, which is applicable to an electric vehicle. Referring to FIG. 2, an HVAC system 11 according to an exemplary embodiment of the present disclosure may include a refrigerant loop 21, and a refrigerant may circulate through the refrigerant loop 21.

A battery cooling system 12 may be thermally connected to the HVAC system 11 through a battery chiller 37 and a water-cooled heat exchanger 70, and a powertrain cooling system 13 may be thermally connected to the HVAC system 11 through the water-cooled heat exchanger 70.

The HVAC system 11 may be configured to heat or cool the air in the passenger compartment of the vehicle using the refrigerant circulating in the refrigerant loop 21. The refrigerant loop 21 may be fluidly connected to an evaporator 31, a compressor 32, an interior condenser 33, a heating-side expansion valve 16, the water-cooled heat exchanger 70, an exterior heat exchanger 35, and a cooling-side expansion valve 15. In FIG. 2, the refrigerant may sequentially pass through the compressor 32, the interior condenser 33, the heating-side expansion valve 16, the water-cooled heat exchanger 70, the exterior heat exchanger 35, the cooling-side expansion valve 15, and the evaporator 31 through the refrigerant loop 21.

The evaporator 31 may be configured to evaporate the refrigerant received from the cooling-side expansion valve 15. That is, the refrigerant expanded by the cooling-side expansion valve 15 may absorb heat from the air and evaporate in the evaporator 31. During a cooling operation of the HVAC system 11, the evaporator 31 may cool the air using the refrigerant cooled by the exterior heat exchanger 35 and expanded by the cooling-side expansion valve 15, and the air cooled by the evaporator 31 may be directed into the passenger compartment.

The compressor 32 may be configured to compress the refrigerant received from the evaporator 31 and/or the battery chiller 37. According to an exemplary embodiment, the compressor 32 may be an electric compressor which is driven by electric energy.

The interior condenser 33 may be configured to condense the refrigerant received from the compressor 32. That is, the refrigerant compressed by the compressor 32 may transfer heat to the air and be condensed in the interior condenser 33. Accordingly, the interior condenser 33 may heat the air using the refrigerant compressed by the compressor 32, and the air heated by the interior condenser 33 may be directed into the passenger compartment.

The exterior heat exchanger 35 may be adjacent to a grille 14 of the vehicle. Since the exterior heat exchanger 35 is exposed to the outside, heat may be transferred between the exterior heat exchanger 35 and the ambient air.

According to an exemplary embodiment, a cooling fan 75 may be located behind the exterior heat exchanger 35, and the exterior heat exchanger 35 may exchange heat with the ambient air forcibly blown by the cooling fan 75 so that a heat transfer rate between the exterior heat exchanger 35 and the ambient air may be further increased.

According to an exemplary embodiment, an active air flap 14a may be configured to adjust the opening degree of the grille 14, and the active air flap 14a may be disposed between the grille 14 and the exterior heat exchanger 35. Each flap of the active air flap 14a may be rotatable to thereby adjust the opening degree of a corresponding opening of the grille 14.

During the cooling operation of the HVAC system 11, the exterior heat exchanger 35 may be configured to condense the refrigerant received from the interior condenser 33. That is, the exterior heat exchanger 35 may serve as an exterior condenser that condenses the refrigerant by transferring heat to the ambient air during the cooling operation of the HVAC system 11. In particular, the exterior heat exchanger 35 may serve as a subcooling condenser that cools the refrigerant during the cooling operation of the HVAC system 11.

During a heating operation of the HVAC system 11, the exterior heat exchanger 35 may be configured to evaporate the refrigerant received from the water-cooled heat exchanger 70. That is, the exterior heat exchanger 35 may serve as an exterior evaporator that evaporates the refrigerant by absorbing heat from the ambient air during the heating operation of the HVAC system 11. In particular, the exterior heat exchanger 35 may serve as a superheating evaporator that superheats the refrigerant during the heating operation of the HVAC system 11.

During the cooling operation of the HVAC system 11, the refrigerant passing through an internal passage of the exterior heat exchanger 35 may be cooled by the air forcibly blown by the cooling fan 75, and accordingly the refrigerant may be condensed and subcooled when passing through the internal passage of the exterior heat exchanger 35.

The water-cooled heat exchanger 70 may transfer heat among the refrigerant loop 21 of the HVAC system 11, a battery coolant loop 22 of the battery cooling system 12, and a powertrain coolant loop 23 of the powertrain cooling system 13. Specifically, the water-cooled heat exchanger 70 may be disposed between the interior condenser 33 and the exterior heat exchanger 35 in the refrigerant loop 21. The water-cooled heat exchanger 70 may include a first passage 71 fluidly connected to the powertrain coolant loop 23, a second passage 72 fluidly connected to the battery coolant loop 22, and a third passage 73 fluidly connected to the refrigerant loop 21.

During the heating operation of the HVAC system 11, the water-cooled heat exchanger 70 may be configured to evaporate the refrigerant which is received from the interior condenser 33 using the heat which is received from the powertrain cooling system 13. That is, during the heating operation of the HVAC system 11, the water-cooled heat exchanger 70 may serve as an evaporator that evaporates the refrigerant by recovering waste heat from electric motors 51a and 51b and power electronics 52a, 52b, and 52c of the powertrain cooling system 13.

During the cooling operation of the HVAC system 11, the water-cooled heat exchanger 70 may be configured to condense the refrigerant received from the interior condenser 33. The water-cooled heat exchanger 70 may serve as a condenser that condenses the refrigerant by cooling the refrigerant using a battery-side coolant circulating in the battery coolant loop 22 of the battery cooling system 12 and a powertrain-side coolant circulating in the powertrain coolant loop 23 of the powertrain cooling system 13. During the cooling operation of the HVAC system 11, the exterior heat exchanger 35 and the water-cooled heat exchanger 70 may serve as a condenser. As the water-cooled heat exchanger 70 is located on the upstream side of the exterior heat exchanger 35, the refrigerant may be preliminarily cooled and condensed by the water-cooled heat exchanger 70, and then be condensed and subcooled by the exterior heat exchanger 35.

According to another exemplary embodiment of the present disclosure, the water-cooled heat exchanger 70 may be removed from the HVAC system 11.

The heating-side expansion valve 16 may be located on the upstream side of the water-cooled heat exchanger 70 in the refrigerant loop 21. Specifically, the heating-side expansion valve 16 may be disposed between the interior condenser 33 and the water-cooled heat exchanger 70. During the heating operation of the HVAC system 11, the heating-side expansion valve 16 may adjust the flow of the refrigerant or the flow rate of the refrigerant into the water-cooled heat exchanger 70. The heating-side expansion valve 16 may be configured to expand the refrigerant received from the interior condenser 33 during the heating operation of the HVAC system 11.

According to an exemplary embodiment, the heating-side expansion valve 16 may be an electronic expansion valve (EXV) having a drive motor 16a. The drive motor 16a may have a shaft which is movable to open or close an orifice defined in a valve body of the heating-side expansion valve 16, and the position of the shaft may be varied depending on the rotation direction, rotation degree, and the like of the drive motor 16a, and thus the opening degree of the orifice of the heating-side expansion valve 16 may be varied. A controller 1000 may control the operation of the drive motor 16a. The heating-side expansion valve 16 may be a full open type EXV. When the HVAC system 11 does not operate in a heating mode, the heating-side expansion valve 16 may be fully opened so that the refrigerant may pass through the heating-side expansion valve 16 without a change in pressure of the refrigerant. When the HVAC system 11 operates in a cooling mode, the opening degree of the heating-side expansion valve 16 may be 100% so that the refrigerant may pass through the heating-side expansion valve 16 without expansion of the refrigerant (without any change in the pressure of the refrigerant).

The opening degree of the heating-side expansion valve 16 may be varied by the controller 1000. As the opening degree of the heating-side expansion valve 16 is varied, the flow rate of the refrigerant into the third passage 73 may be varied. The heating-side expansion valve 16 may be controlled by the controller 1000 during the heating operation of the HVAC system 11. The cooling-side expansion valve 15 may be disposed between the exterior heat exchanger 35 and the evaporator 31 in the refrigerant loop 21. As the cooling-side expansion valve 15 is located on the upstream side of the evaporator 31, the cooling-side expansion valve 15 may adjust the flow of the refrigerant or the flow rate of the refrigerant into the evaporator 31, and the cooling-side expansion valve 15 may be configured to expand the refrigerant received from the exterior heat exchanger 35 during the cooling operation of the HVAC system 11.

According to an exemplary embodiment, the cooling-side expansion valve 15 may be a thermal expansion valve (TXV) which senses the temperature and/or pressure of the refrigerant and adjusts the opening degree of the cooling-side expansion valve 15. Specifically, the cooling-side expansion valve 15 may be a TXV having a shut-off valve 15a selectively blocking the flow of the refrigerant toward an internal passage of the cooling-side expansion valve 15, and the shut-off valve 15a may be a solenoid valve. The shut-off valve 15a may be opened or closed by the controller 1000, thereby unblocking or blocking the flow of the refrigerant toward the cooling-side expansion valve 15. When the shut-off valve 15a is opened, the refrigerant may be allowed to flow into the cooling-side expansion valve 15, and when the shut-off valve 15a is closed, the refrigerant may be blocked from flowing into the cooling-side expansion valve 15. According to an exemplary embodiment, the shut-off valve 15a may be mounted in the inside of a valve body of the cooling-side expansion valve 15, thereby opening or closing the internal passage of the cooling-side expansion valve 15. According to another exemplary embodiment, the shut-off valve 15a may be located on the upstream side of the cooling-side expansion valve 15, thereby selectively opening or closing an inlet of the cooling-side expansion valve 15.

When the shut-off valve 15a is closed, the flow of the refrigerant into the cooling-side expansion valve 15 may be blocked, and accordingly the refrigerant may only be directed into the battery chiller 37 without flowing into the cooling-side expansion valve 15 and the evaporator 31. That is, when the shut-off valve 15a of the cooling-side expansion valve 15 is closed, the cooling operation of the HVAC system 11 may not be performed, and only the battery chiller 37 may be cooled or the heating operation of the HVAC system 11 may be performed. When the shut-off valve 15a is opened, the refrigerant may be directed into the cooling-side expansion valve 15 and the evaporator 31. That is, when the shut-off valve 15a of the cooling-side expansion valve 15 is opened, the cooling operation of the HVAC system 11 may be performed.

The HVAC system 11 may include an HVAC housing 30 having an inlet and outlets. The HVAC housing 30 may be mounted on a dash panel of the vehicle while facing front seats of the vehicle. The HVAC housing 30 may be configured to allow the air to be directed into the passenger compartment of the vehicle. The evaporator 31 and the interior condenser 33 may be located in the HVAC housing 30. An air mixing door 34a may be disposed between the evaporator 31 and the interior condenser 33, and a PTC heater 34b may be located on the downstream side of the interior condenser 33.

The HVAC system 11 may further include an accumulator 38 disposed between the evaporator 31 and the compressor 32 in the refrigerant loop 21, and the accumulator 38 may be located on the downstream side of the evaporator 31. The accumulator 38 may separate a liquid refrigerant from the refrigerant which is received from the evaporator 31, thereby preventing the liquid refrigerant from entering the compressor 32.

The HVAC system 11 may further include a branch conduit 36 branching off from the refrigerant loop 21. The branch conduit 36 may branch off from an upstream point of the cooling-side expansion valve 15 and be connected to the compressor 32 in the refrigerant loop 21. The battery chiller 37 may be fluidly connected to the branch conduit 36, and the battery chiller 37 may be configured to transfer heat between the branch conduit 36 and the battery coolant loop 22 to be described below. That is, the battery chiller 37 may be configured to transfer heat between the refrigerant circulating in the refrigerant loop 21 of the HVAC system 11 and the battery-side coolant circulating in the battery coolant loop 22 of the battery cooling system 12.

Specifically, the battery chiller 37 may include a first passage 37a fluidly connected to the branch conduit 36, and a second passage 37b fluidly connected to the battery coolant loop 22. The first passage 37a and the second passage 37b may be adjacent to or contact each other within the battery chiller 37, and the first passage 37a may be fluidly separated from the second passage 37b. Accordingly, the battery chiller 37 may transfer heat between the battery-side coolant passing through the second passage 37b and the refrigerant passing through the first passage 37a. The branch conduit 36 may be fluidly connected to the accumulator 38, and the refrigerant passing through the branch conduit 36 may be received in the accumulator 38.

A chiller-side expansion valve 17 may be located on the upstream side of the battery chiller 37 in the branch conduit 36. The chiller-side expansion valve 17 may adjust the flow of the refrigerant or the flow rate of the refrigerant into the battery chiller 37, and the chiller-side expansion valve 17 may be configured to expand the refrigerant received from the exterior heat exchanger 35.

According to an exemplary embodiment, the chiller-side expansion valve 17 may be an EXV having a drive motor 17a. The drive motor 17a may have a shaft which is movable to open or close an orifice defined in a valve body of the chiller-side expansion valve 17, and the position of the shaft may be varied depending on the rotation direction, rotation degree, and the like of the drive motor 17a, and thus the opening degree of the orifice of the chiller-side expansion valve 17 may be varied. The controller 1000 may control the operation of the drive motor 17a. The chiller-side expansion valve 17 may be a full open type EXV.

As the opening degree of the chiller-side expansion valve 17 is varied, the flow rate of the refrigerant into the battery chiller 37 may be varied. For example, when the opening degree of the chiller-side expansion valve 17 is greater than a reference opening degree, the flow rate of the refrigerant into the battery chiller 37 may be relatively increased above a reference flow rate, and when the opening degree of the chiller-side expansion valve 17 is less than the reference opening degree, the flow rate of the refrigerant into the battery chiller 37 may be similar to the reference flow rate or be relatively lowered below the reference flow rate. Here, the reference opening degree refers to an opening degree of the chiller-side expansion valve 17 required for maintaining a target evaporator temperature, and the reference flow rate refers to a flow rate of the refrigerant which is allowed to flow into the battery chiller 37 when the chiller-side expansion valve 17 is opened to the reference opening degree. When the chiller-side expansion valve 17 is opened to the reference opening degree, the refrigerant may be directed into the battery chiller 37 at a corresponding reference flow rate.

As the opening degree of the cooling-side expansion valve 15 and the opening degree of the chiller-side expansion valve 17 are adjusted by the controller 1000, the refrigerant may be distributed to the evaporator 31 and the battery chiller 37 at a predetermined ratio, and thus the cooling of the HVAC system 11 and the cooling of the battery chiller 37 may be performed simultaneously or selectively.

The HVAC system 11 may include a first refrigerant bypass conduit 25 connecting a downstream point of the third passage 73 of the water-cooled heat exchanger 70 and the branch conduit 36. An inlet of the first refrigerant bypass conduit 25 may be connected to the downstream point of the water-cooled heat exchanger 70, and an outlet of the first refrigerant bypass conduit 25 may be connected to the branch conduit 36. Specifically, the inlet of the first refrigerant bypass conduit 25 may be connected to a point between the water-cooled heat exchanger 70 and the exterior heat exchanger 35, and the outlet of the first refrigerant bypass conduit 25 may be connected to a point between the battery chiller 37 and the compressor 32 in the branch conduit 36. A first three-way valve 61 may be disposed at a junction between the inlet of the first refrigerant bypass conduit 25 and the refrigerant loop 21. Accordingly, the first three-way valve 61 may be disposed between the exterior heat exchanger 35 and the water-cooled heat exchanger 70 in the refrigerant loop 21. When the first three-way valve 61 is switched to open the inlet of the first refrigerant bypass conduit 25, the refrigerant having passed through the third passage 73 of the water-cooled heat exchanger 70 may be directed into the compressor 32 through the first refrigerant bypass conduit 25 and the accumulator 38. That is, when the inlet of the first refrigerant bypass conduit 25 is opened by the switching of the first three-way valve 61, the refrigerant may bypass the exterior heat exchanger 35. When the first three-way valve 61 is switched to close the inlet of the first refrigerant bypass conduit 25, the refrigerant having passed through the third passage 73 of the water-cooled heat exchanger 70 may be directed into the exterior heat exchanger 35 without passing through the first refrigerant bypass conduit 25. That is, when the inlet of the first refrigerant bypass conduit 25 is closed by the switching of the first three-way valve 61, the refrigerant may pass through the exterior heat exchanger 35.

The controller 1000 may be configured to control respective operations of the shut-off valve 15a of the cooling-side expansion valve 15, the heating-side expansion valve 16, the chiller-side expansion valve 17, the compressor 32, and the like, and thus the overall operation of the HVAC system 11 may be controlled by the controller 1000. According to an exemplary embodiment, the controller 1000 may be a full automatic temperature control (FATC) system.

When the HVAC system 11 operates in the cooling mode, the shut-off valve 15a of the cooling-side expansion valve 15 may be opened, and accordingly the refrigerant may sequentially circulate through the compressor 32, the interior condenser 33, the heating-side expansion valve 16, the third passage 73 of the water-cooled heat exchanger 70, the exterior heat exchanger 35, the cooling-side expansion valve 15, and the evaporator 31.

When the HVAC system 11 operates in the heating mode, the shut-off valve 15a of the cooling-side expansion valve 15 may be closed, and accordingly the refrigerant may sequentially circulate through the compressor 32, the interior condenser 33, the heating-side expansion valve 16, the third passage 73 of the water-cooled heat exchanger 70, the exterior heat exchanger 35, the chiller-side expansion valve 17, the first passage 37a of the battery chiller 37, and the compressor 32. Meanwhile, during the heating operation of the HVAC system 11, when the shut-off valve 15a of the cooling-side expansion valve 15 is closed and the inlet of the first refrigerant bypass conduit 25 is opened by the switching of the first three-way valve 61, the refrigerant may sequentially circulate through the compressor 32, the interior condenser 33, the heating-side expansion valve 16, the third passage 73 of the water-cooled heat exchanger 70, and the compressor 32.

The HVAC system 11 according to an exemplary embodiment of the present disclosure may further include a branch conduit 26 branching off from the refrigerant loop 21. The branch conduit 26 may branch off from a point between the heating-side expansion valve 16 and the water-cooled heat exchanger 70 in the refrigerant loop 21, and the branch conduit 26 may extend to a downstream point of the cooling-side expansion valve 15. A shut-off valve 27 may be provided to selectively block or unblock the flow of the refrigerant in the branch conduit 26. When dehumidification of the passenger compartment is required during the heating operation of the HVAC system 11, the shut-off valve 27 may be opened so that a portion of the refrigerant flowing from the heating-side expansion valve 16 to the water-cooled heat exchanger 70 may be directed into the evaporator 31 through the branch conduit 26. Accordingly, the refrigerant entering the evaporator 31 may absorb heat from the air passing through the evaporator 31, and thus the heating and dehumidification of the passenger compartment may be simultaneously performed.

The battery cooling system 12 may include the battery coolant loop 22, and the battery-side coolant for cooling a battery 41 may circulate through the battery coolant loop 22.

The battery cooling system 12 may be configured to cool the battery 41 or increase a temperature of the battery 41 using the battery-side coolant circulating in the battery coolant loop 22. The battery coolant loop 22 may be fluidly connected to a battery radiator 43, a reservoir tank 48, a first battery-side pump 44, the battery chiller 37, a heater 42, the battery 41, a second battery-side pump 45, and the water-cooled heat exchanger 70. In FIG. 2, the battery-side coolant may sequentially pass through the battery radiator 43, the reservoir tank 48, the first battery-side pump 44, the battery chiller 37, the heater 42, the battery 41, the second battery-side pump 45, and the second passage 72 of the water-cooled heat exchanger 70 through the battery coolant loop 22.

The battery 41 may have a coolant passage provided inside or outside thereof, and the battery-side coolant may pass through the coolant passage. The battery coolant loop 22 may be fluidly connected to the coolant passage of the battery 41.

The heater 42 may be disposed between the battery chiller 37 and the battery 41, and the heater 42 may heat the battery-side coolant circulating in the battery coolant loop 22 to warm up the coolant. According to an exemplary embodiment, the heater 42 may be an electric heater. According to another exemplary embodiment, the heater 42 may heat the battery-side coolant by exchanging heat with a high-temperature fluid.

The battery radiator 43 may be adjacent to the front grille of the vehicle, and the battery-side coolant passing through the battery radiator 43 may be cooled using the ambient air forcibly blown by the cooling fan 75. The battery radiator 43 may be adjacent to the exterior heat exchanger 35. According to an exemplary embodiment, the battery radiator 43 may be referred to as a low temperature radiator (LTR).

The first battery-side pump 44 may be configured to allow the battery-side coolant to circulate through at least a portion of the battery coolant loop 22, and the second battery-side pump 45 may be configured to allow the battery-side coolant to circulate through at least a portion of the battery coolant loop 22.

The reservoir tank 48 may be located between an outlet of the battery radiator 43 and an inlet of the first battery-side pump 44.

According to an exemplary embodiment, the battery coolant loop 22 may include a first coolant conduit 22a and a second coolant conduit 22b connected through a first connection conduit 22c and a second connection conduit 22d. The first coolant conduit 22a may be fluidly connected to the battery radiator 43, the reservoir tank 48, the first battery-side pump 44, and the second passage 72 of the water-cooled heat exchanger 70, and the second coolant conduit 22b may be fluidly connected to the battery chiller 37, the heater 42, the battery 41, and the second battery-side pump 45.

The first connection conduit 22c may connect a downstream point of the first battery-side pump 44 and an upstream point of the second passage 37b of the battery chiller 37. Specifically, an inlet of the first connection conduit 22c may be connected to the downstream point of the first battery-side pump 44, and an outlet of the first connection conduit 22c may be connected to the upstream point of the second passage 37b of the battery chiller 37.

The second connection conduit 22d may connect a downstream point of the second battery-side pump 45 and an upstream point of the second passage 72 of the water-cooled heat exchanger 70. Specifically, an inlet of the second connection conduit 22d may be connected to the downstream point of the second battery-side pump 45, and an outlet of the second connection conduit 22d may be connected to the upstream point of the second passage 72 of the water-cooled heat exchanger 70.

The first battery-side pump 44 may be disposed on a downstream point of the battery radiator 43 in the first coolant conduit 22a of the battery coolant loop 22.

The second battery-side pump 45 may be disposed on a downstream point of the battery 41 in the second coolant conduit 22b of the battery coolant loop 22.

The first battery-side pump 44 and the second battery-side pump 45 may operate individually and selectively according to the thermal condition and charging condition of the battery 41, the operating condition of the HVAC system 11, and the like.

The battery cooling system 12 may include a second three-way valve 62 mounted in at least one of the first and second connection conduits 22c and 22d.

Referring to FIG. 2, the second three-way valve 62 may be disposed at the outlet of the first connection conduit 22c. That is, the second three-way valve 62 may be disposed at a junction between the first connection conduit 22c and the second coolant conduit 22b.

When the second three-way valve 62 is switched to open the outlet of the first connection conduit 22c, the first coolant conduit 22a may be fluidly connected to the second coolant conduit 22b through the first connection conduit 22c and the second connection conduit 22d, and accordingly the battery-side coolant may entirely circulate through the first coolant conduit 22a and the second coolant conduit 22b.

When the second three-way valve 62 is switched to close the outlet of the first connection conduit 22c, the first coolant conduit 22a may be fluidly separated from the second coolant conduit 22b, and accordingly the battery-side coolant may circulate in the first coolant conduit 22a and the second coolant conduit 22b independently of each other. Specifically, in a state in which the second three-way valve 62 is switched to close the outlet of the first connection conduit 22c, a portion of the battery-side coolant may circulate in the first coolant conduit 22a through the first battery-side pump 44 so that it may sequentially pass through the battery radiator 43, the reservoir tank 48, and the second passage 72 of the water-cooled heat exchanger 70, and a remaining portion of the battery-side coolant may circulate in the second coolant conduit 22b through the second battery-side pump 45 so that it may sequentially pass through the second passage 37b of the battery chiller 37, the heater 42, and the battery 41.

The battery cooling system 12 may be controlled by a battery management system 1100. The battery management system 1100 may monitor the state of the battery 41, and perform the cooling of the battery 41 when the temperature of the battery 41 is higher than or equal to a threshold temperature. The battery management system 1100 may transmit an instruction for the cooling of the battery 41 to the controller 1000, and accordingly the controller 1000 may control the compressor 32 to operate and control the chiller-side expansion valve 17 to open. When the operation of the HVAC system 11 is not required during the cooling operation of the battery 41, the controller 1000 may control the cooling-side expansion valve 15 to close. In addition, the battery management system 1100 may control the operation of the first battery-side pump 44, the operation of the second battery-side pump 45, and the switching of the second three-way valve 62 as necessary so that the battery-side coolant may selectively flow through the first coolant conduit 22a and the second coolant conduit 22b.

The powertrain cooling system 13 may include the powertrain coolant loop 23, and the powertrain-side coolant for cooling powertrain components (the electric motors and the power electronics) may circulate through the powertrain coolant loop 23.

The powertrain cooling system 13 may be configured to cool the powertrain components of an electric powertrain using the powertrain-side coolant circulating in the powertrain coolant loop 23. The powertrain components may include one or more electric motors 51a and 51b and one or more power electronics 52a, 52b, and 52c. The powertrain coolant loop 23 may be fluidly connected to a powertrain radiator 53, a reservoir tank 56, a powertrain-side pump 54, the power electronics 52a, 52b, and 52c, the electric motors 51a and 51b, and the first passage 71 of the water-cooled heat exchanger 70. Referring to FIG. 2, the powertrain-side coolant may sequentially pass through the powertrain radiator 53, the reservoir tank 56, the powertrain-side pump 54, the power electronics 52a, 52b, and 52c, the electric motors 51a and 51b, and the first passage 71 of the water-cooled heat exchanger 70 through the powertrain coolant loop 23.

The electric motors 51a and 51b may have a coolant passage provided inside or outside thereof, and the powertrain-side coolant may pass through the coolant passage. The powertrain coolant loop 23 may be fluidly connected to the coolant passage of each of the electric motors 51a and 51b. Referring to FIG. 2, the electric motors 51a and 51b may include a front-wheel-side electric motor 51a and a rear-wheel-side electric motor 51b. The power electronics 52a, 52b, and 52c may be one or more power electronics components related to the driving of the electric motors 51a and 51b. The power electronics 52a, 52b, and 52c may have a coolant passage provided inside or outside thereof, and the powertrain-side coolant may pass through the coolant passage. The powertrain coolant loop 23 may be fluidly connected to the coolant passage of each of the power electronics 52a, 52b, and 52c. Referring to FIG. 2, the power electronics 52a, 52b, and 52c may be a rear-wheel-side inverter 52a, a front-wheel-side inverter 52b, and an on-board charger (OBC)/low DC-DC converter (LDC) 52c.

The powertrain radiator 53 may be adjacent to the front grille of the vehicle, and the powertrain-side coolant passing through the powertrain radiator 53 may be cooled using the ambient air forcibly blown by the cooling fan 75. According to an exemplary embodiment, the powertrain radiator 53 may be referred to as a high temperature radiator (HTR).

The exterior heat exchanger 35, the battery radiator 43, and the powertrain radiator 53 may be adjacent to each other on the front of the vehicle, and accordingly the exterior heat exchanger 35, the battery radiator 43, and the powertrain radiator 53 may come into contact with the ambient air and exchange heat with the ambient air. The cooling fan 75 may be disposed behind the exterior heat exchanger 35, the battery radiator 43, and the powertrain radiator 53.

The reservoir tank 56 may be located on the downstream side of the powertrain radiator 53. In particular, the reservoir tank 56 may be disposed between an outlet of the powertrain radiator 53 and the powertrain-side pump 54 in the powertrain coolant loop 23.

The powertrain-side pump 54 may be located on the upstream side of the electric motors 51a and 51b and the power electronics 52a, 52b, and 52c, and the powertrain-side pump 54 may be configured to allow the powertrain-side coolant to circulate through the powertrain coolant loop 23.

The powertrain cooling system 13 may further include a powertrain bypass conduit 55 allowing the powertrain-side coolant to bypass the powertrain radiator 53. The powertrain bypass conduit 55 may directly connect an upstream point of the powertrain radiator 53 and a downstream point of the powertrain radiator 53 in the powertrain coolant loop 23 so that the powertrain-side coolant may bypass the powertrain radiator 53 through the powertrain bypass conduit 55.

An inlet of the powertrain bypass conduit 55 may be connected to a point between an inlet of the powertrain radiator 53 and the electric motors 51a and 51b in the powertrain coolant loop 23. Specifically, the inlet of the powertrain bypass conduit 55 may be connected to a point between the inlet of the powertrain radiator 53 and the first passage 71 of the water-cooled heat exchanger 70 in the powertrain coolant loop 23. An outlet of the powertrain bypass conduit 55 may be connected to a point between the outlet of the powertrain radiator 53 and the reservoir tank 56 in the powertrain coolant loop 23.

The powertrain cooling system 13 may include a third three-way valve 63 disposed at the inlet of the powertrain bypass conduit 55. When the third three-way valve 63 is switched to open the inlet of the powertrain bypass conduit 55, the powertrain-side coolant may pass through the powertrain bypass conduit 55 so that the powertrain-side coolant may bypass the powertrain radiator 53, and accordingly the powertrain-side coolant may sequentially pass through the first passage 71 of the water-cooled heat exchanger 70, the powertrain bypass conduit 55, the reservoir tank 56, the powertrain-side pump 54, the power electronics 52a, 52b, and 52c, and the electric motors 51a and 51b. When the third three-way valve 63 is switched to close the inlet of the powertrain bypass conduit 55, the powertrain-side coolant may not be directed to the powertrain bypass conduit 55, and accordingly the powertrain-side coolant may sequentially pass through the first passage 71 of the water-cooled heat exchanger 70, the powertrain radiator 53, the reservoir tank 56, the powertrain-side pump 54, the power electronics 52a, 52b, and 52c, and the electric motors 51a and 51b.

The powertrain cooling system 13 may be controlled by a powertrain controller 1200. The powertrain controller 1200 may monitor the states of the powertrain components (the electric motors, the power electronics, and the like), and perform the cooling of the powertrain components when the temperatures of the powertrain components are higher than or equal to a threshold temperature. The switching of the third three-way valve 63 and the operation of the powertrain-side pump 54 may be controlled by the controller 1000.

Referring to FIG. 2, the HVAC system 11, the battery cooling system 12, and the powertrain cooling system 13 may form a vehicle thermal management system. The vehicle thermal management system may include an interior temperature sensor for measuring the interior temperature of the vehicle, an ambient temperature sensor for measuring the ambient temperature of the vehicle, a battery temperature sensor for measuring the temperature of the battery 41, a coolant temperature sensor for measuring the temperature of the battery-side coolant, and a refrigerant sensor for measuring the temperature and pressure of the refrigerant.

Figure 3:
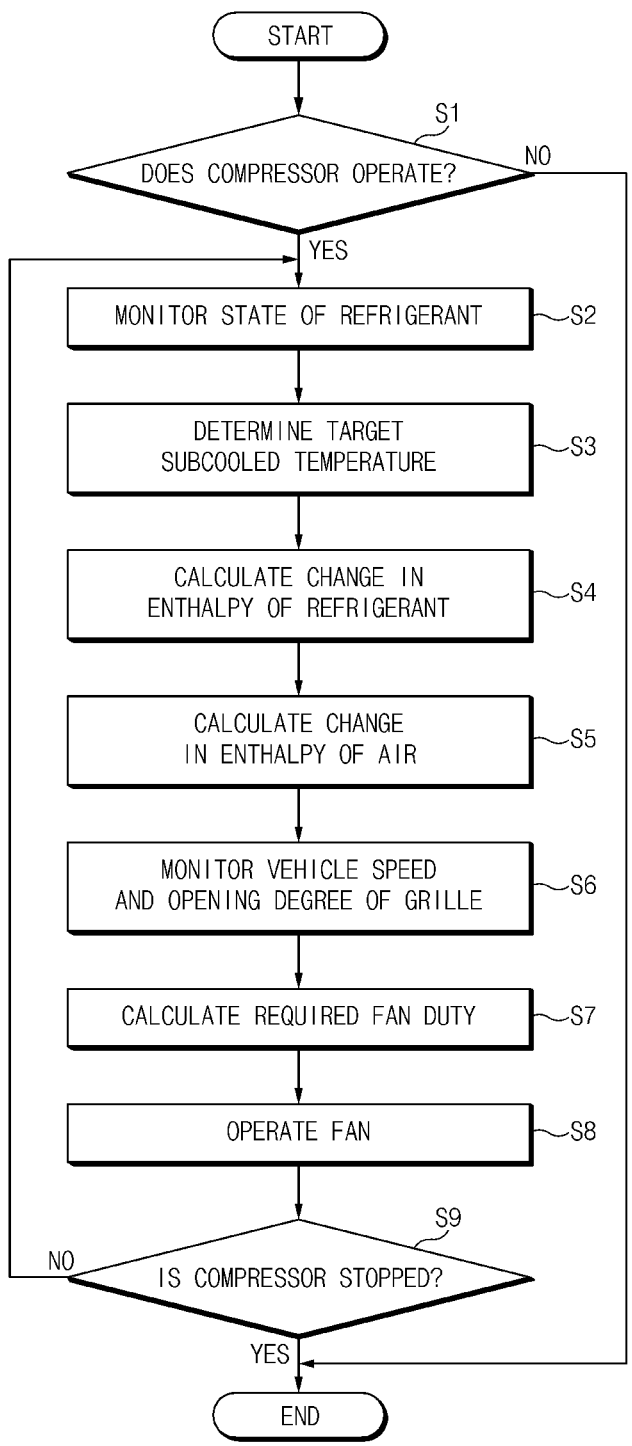
FIG. 3 illustrates a flowchart of a method for controlling the HVAC system illustrated in FIG. 1.

FIG. 3 illustrates a flowchart of a method for controlling the vehicle HVAC system illustrated in FIG. 1.

Referring to FIG. 3, it may be determined whether the compressor 5 of the vehicle HVAC system operates (S1).

When the compressor 5 operates, the controller 100 may monitor the state of a refrigerant using the temperature and pressure of the refrigerant measured by a refrigerant sensor (not shown) (S2). When the compressor 5 does not operate, the method according to an exemplary embodiment of the present disclosure may end.

The controller 100 may determine a target subcooled temperature of the refrigerant based on the temperature and pressure of the refrigerant discharged from the outlet of the compressor 5 (S3).

The controller 100 may calculate a change in enthalpy of the refrigerant based on the determined target subcooled temperature in a process of condensing and subcooling the refrigerant (S4). Here, when the refrigerant flows from the outlet of the compressor 5 to an outlet of the condenser 6, the enthalpy change of the refrigerant may be calculated by considering a change in a saturated temperature of the refrigerant according to a pressure drop of the refrigerant.

The controller 100 may calculate a change in enthalpy of air passing over an exterior surface of the condenser 6 based on the calculated refrigerant enthalpy change (S1). Specifically, the enthalpy change of the air may be calculated based on a temperature difference between the refrigerant and the air, a specific heat of the air, a flow rate of the refrigerant passing through the condenser 6, and the like.

The controller 100 may monitor a vehicle speed and an opening degree of the grille 8 (S6). The vehicle speed may be received from a vehicle controller, and the opening degree of the grille 8 may be adjusted by the active air flap 8a.

The controller 100 may calculate a required fan duty of the cooling fan 9 based on the calculated air enthalpy change, the vehicle speed, and the opening degree of the grille 8 (S7). Here, the required fan duty of the cooling fan 9 refers to a fan duty optimized to meet the target subcooled temperature of the refrigerant.

The controller 100 may operate the cooling fan 9 according to the calculated required fan duty (S8).

Then, the controller 100 may determine whether the compressor 5 is stopped (S9). When the compressor 5 is not stopped, the method according to this exemplary embodiment may return to S2.

Figure 4:
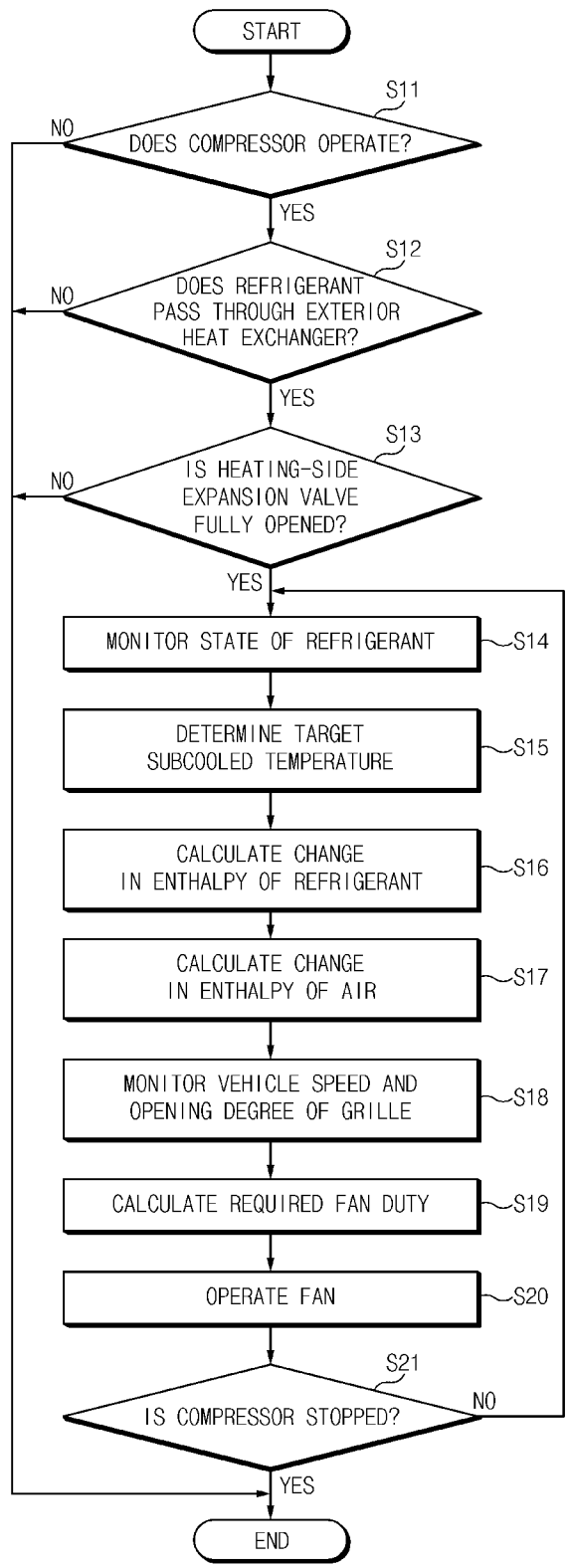
FIG. 4 illustrates a flowchart of a method for controlling the HVAC system illustrated in FIG. 2, in a condition in which a water-cooled heat exchanger is removed from the HVAC system.

FIG. 4 illustrates a flowchart of a method for controlling the vehicle HVAC system 11 illustrated in FIG. 2. According to an exemplary embodiment illustrated in FIG. 4, the method may be performed in a condition in which the water-cooled heat exchanger 70 is removed from the HVAC system 11.

Referring to FIG. 4, it may be determined whether the compressor 32 of the vehicle HVAC system 11 operates (S11).

During the cooling operation of the vehicle HVAC system, the exterior heat exchanger 35 may serve as a condenser. The controller 1000 may determine whether a refrigerant passes through the exterior heat exchanger 35 serving as the condenser (S12). When the first three-way valve 61 is switched to close the inlet of the first refrigerant bypass conduit 25, the refrigerant may pass through the internal passage of the exterior heat exchanger 35 without passing through the first refrigerant bypass conduit 25. Accordingly, the controller 1000 may determine whether the refrigerant passes through the internal passage of the exterior heat exchanger 35 according to the switching operation of the first three-way valve 61.

The controller 1000 may determine whether the heating-side expansion valve 16 is fully opened (S13). During the cooling operation of the HVAC system 11, the opening degree of the heating-side expansion valve 16 may be 100%, and accordingly the refrigerant may pass through the heating-side expansion valve 16 without expansion of the refrigerant.

When the compressor 32 operates, the refrigerant passes through the exterior heat exchanger 35 serving as the condenser, and the heating-side expansion valve 16 is fully opened, the controller 1000 may monitor the state of the refrigerant using the temperature and pressure of the refrigerant measured by the refrigerant sensor (not shown) (S14).

When the compressor 32 does not operate, the refrigerant does not pass through the exterior heat exchanger 35, or the heating-side expansion valve 16 is not fully opened, the method according to this exemplary embodiment may end.

The controller 1000 may determine a target subcooled temperature of the refrigerant based on the temperature and pressure of the refrigerant discharged from an outlet of the compressor 32 (S15).

The controller 1000 may calculate a change in enthalpy of the refrigerant based on the determined target subcooled temperature in a process of condensing and subcooling the refrigerant (S16). Here, when the refrigerant flows from the outlet of the compressor 32 to the internal passage of the exterior heat exchanger 35, the enthalpy change of the refrigerant may be calculated by considering a change in a saturated temperature of the refrigerant according to a pressure drop of the refrigerant.

The controller 1000 may calculate a change in enthalpy of air passing over an exterior surface of the exterior heat exchanger 35 based on the calculated refrigerant enthalpy change (S17). Specifically, the enthalpy change of the air may be calculated based on a temperature difference between the refrigerant and the air, a specific heat of the air, a flow rate of the refrigerant passing through the exterior heat exchanger 35, and the like.

The controller 1000 may monitor a vehicle speed and an opening degree of the grille 14 (S18). The vehicle speed may be received from a vehicle controller 1300, and the opening degree of the grille 14 may be adjusted by the active air flap 14a. A flow rate of the air passing over the exterior surface of the exterior heat exchanger 35 may be calculated based on the vehicle speed and the opening degree of the grille 14.

The controller 1000 may calculate a required fan duty of the cooling fan 75 based on the calculated air enthalpy change, the vehicle speed, and the opening degree of the grille 14 (S19). Here, the required fan duty of the cooling fan 75 refers to a fan duty optimized to meet the target subcooled temperature of the refrigerant.

The controller 1000 may operate the cooling fan 75 according to the calculated required fan duty (S20).

Then, the controller 1000 may determine whether the compressor 32 is stopped (S21). When the compressor 32 is not stopped, the method according to this exemplary embodiment may return to S14.

Figure 5:
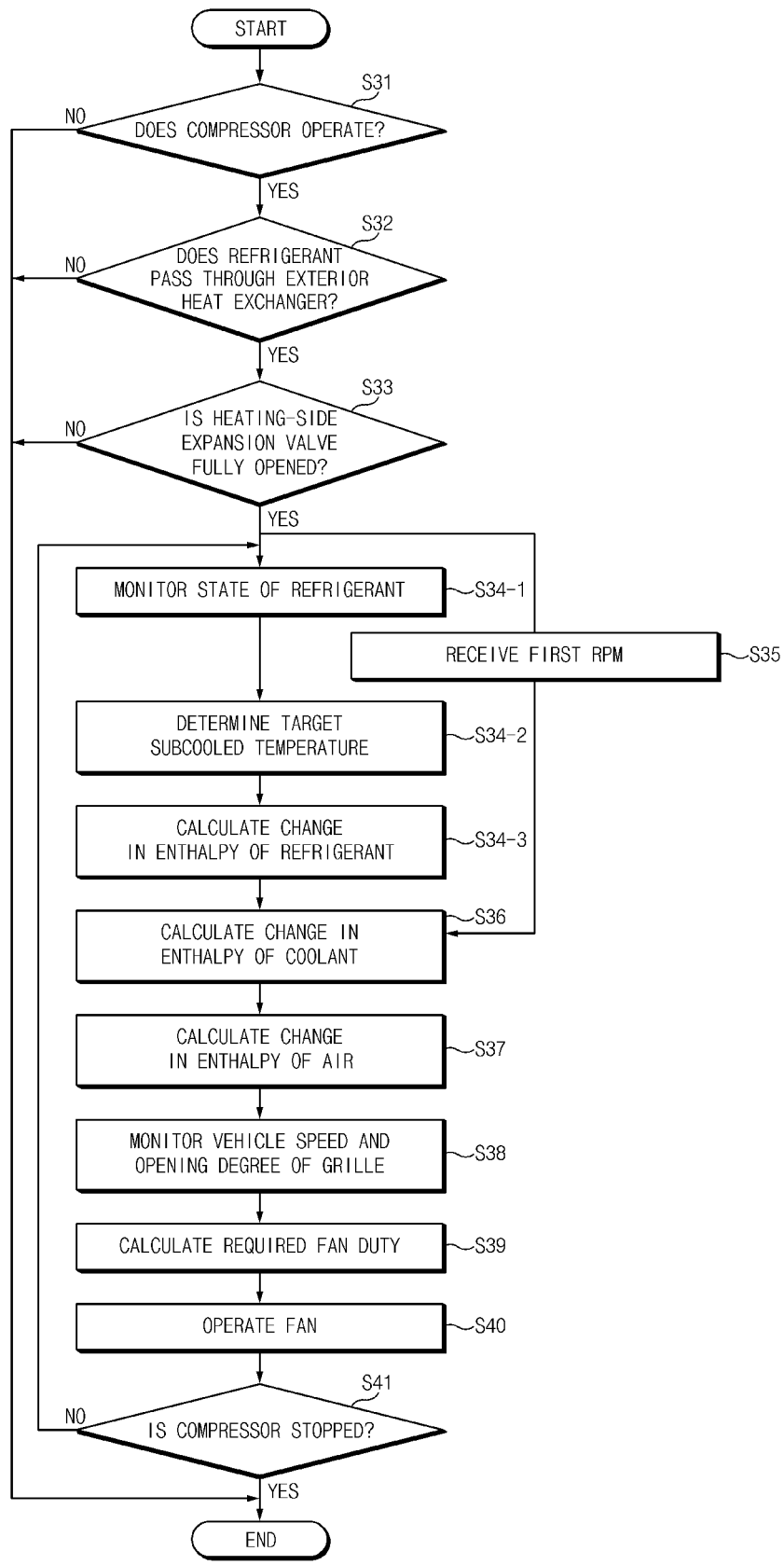
FIG. 5 illustrates a flowchart of a method for controlling the HVAC system illustrated in FIG. 2 according to an exemplary embodiment of the present disclosure.

FIG. 5 illustrates a flowchart of a method for controlling the vehicle HVAC system 11 illustrated in FIG. 2. According to an exemplary embodiment illustrated in FIG. 5, the method may be performed in a condition in which a refrigerant is cooled using the water-cooled heat exchanger 70 in the vehicle HVAC system 11.

Referring to FIG. 5, it may be determined whether the compressor 32 of the vehicle HVAC system 11 operates (S31).

During the cooling operation of the vehicle HVAC system, the exterior heat exchanger 35 may serve as a condenser. The controller 1000 may determine whether a refrigerant passes through the exterior heat exchanger 35 serving as the condenser (S32). When the first three-way valve 61 is switched to close the inlet of the first refrigerant bypass conduit 25, the refrigerant may pass through the internal passage of the exterior heat exchanger 35 without passing through the first refrigerant bypass conduit 25. Accordingly, the controller 1000 may determine whether the refrigerant passes through the internal passage of the exterior heat exchanger 35 according to the switching operation of the first three-way valve 61.

The controller 1000 may determine whether the heating-side expansion valve 16 is fully opened (S33). During the cooling operation of the HVAC system 11, the opening degree of the heating-side expansion valve 16 may be 100%, and accordingly the refrigerant may pass through the heating-side expansion valve 16 without expansion of the refrigerant.

When the compressor 32 operates, the refrigerant passes through the exterior heat exchanger 35 serving as the condenser, and the heating-side expansion valve 16 is fully opened (that is, when it is determined in S33 that the heating-side expansion valve 16 is fully opened), the controller 1000 may monitor the state of the refrigerant using the temperature and pressure of the refrigerant measured by the refrigerant sensor (not shown) (S34-1).

When the compressor 32 does not operate, the refrigerant does not pass through the exterior heat exchanger 35, or the heating-side expansion valve 16 is not fully opened, the method according to this exemplary embodiment may end.

The controller 1000 may determine a target subcooled temperature of the refrigerant based on the temperature and pressure of the refrigerant discharged from the outlet of the compressor 32 (S34-2).

The controller 1000 may calculate a change in enthalpy of the refrigerant based on the determined target subcooled temperature in a process of condensing and subcooling the refrigerant (S34-3). Here, when the refrigerant flows from the outlet of the compressor 32 to the internal passage of the exterior heat exchanger 35, the enthalpy change of the refrigerant may be calculated by considering a change in a saturated temperature of the refrigerant according to a pressure drop of the refrigerant.

When the compressor 32 operates, the refrigerant passes through the exterior heat exchanger 35 serving as the condenser, and the heating-side expansion valve 16 is fully opened (that is, when it is determined in S33 that the heating-side expansion valve 16 is fully opened), the controller 1000 may receive a first RPM of each of the first battery-side pump 44 and/or the second battery-side pump 45, and the powertrain-side pump 54 from the external controllers 1100, 1200, and 1300 (S35). The first RPM may include at least one of the following: the RPM of the first battery-side pump 44 and/or the second battery-side pump 45 determined by the battery management system 1100; the RPM of the powertrain-side pump 54 determined by the powertrain controller 1200; and the RPM of each of the first battery-side pump 44 and/or the second battery-side pump 45, and the powertrain-side pump 54 determined by the vehicle controller 1300.

The controller 1000 may calculate a change in enthalpy of a coolant passing through the water-cooled heat exchanger 70 (a change in enthalpy of the battery-side coolant and a change in enthalpy of the powertrain-side coolant) based on the received first RPM (S36).

The controller 1000 may calculate a change in enthalpy of air passing over the exterior surface of the exterior heat exchanger 35 based on the calculated refrigerant enthalpy change, the calculated battery-side coolant enthalpy change, and the calculated powertrain-side coolant enthalpy change (S37). Specifically, the enthalpy change of the air may be calculated based on a temperature difference between the refrigerant and the air, a specific heat of the air, a flow rate of the refrigerant passing through the exterior heat exchanger 35, and the like.

The controller 1000 may monitor a vehicle speed and an opening degree of the grille 14 (S38). The vehicle speed may be received from the vehicle controller 1300, and the opening degree of the grille 14 may be adjusted by the active air flap 14a. A flow rate of the air passing over the exterior surface of the exterior heat exchanger 35 may be calculated based on the vehicle speed and the opening degree of the grille 14.

The controller 1000 may calculate a required fan duty of the cooling fan 75 based on the calculated air enthalpy change, the vehicle speed, and the opening degree of the grille 14 (S39). Here, the required fan duty of the cooling fan 75 refers to a fan duty optimized to meet the target subcooled temperature of the refrigerant.

The controller 1000 may operate the cooling fan 75 according to the calculated required fan duty (S40).

Then, the controller 1000 may determine whether the compressor 32 is stopped (S41). When the compressor 32 is not stopped, the method according to this exemplary embodiment may return to S34-1.

Figure 6:
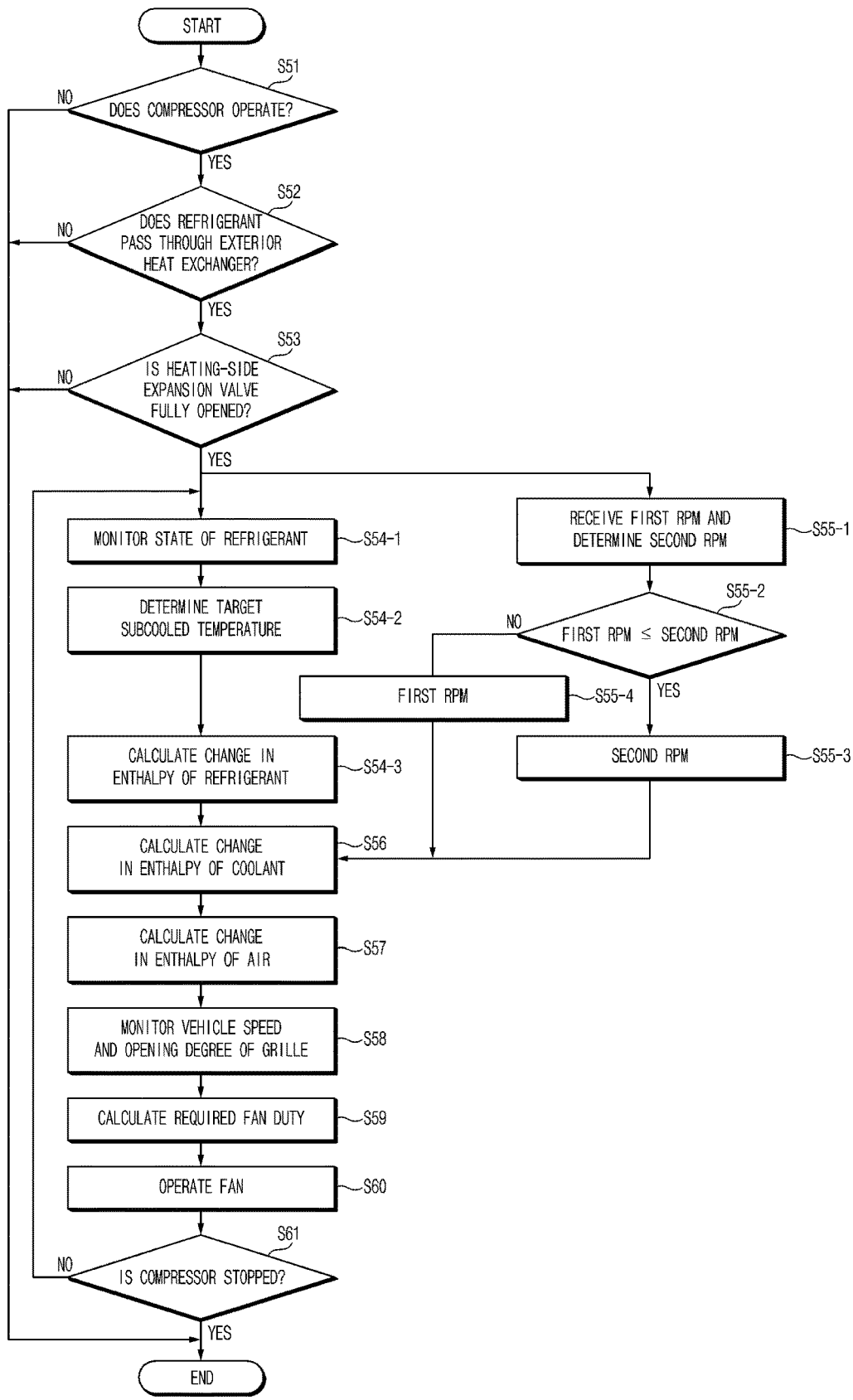
FIG. 6 illustrates a flowchart of a method for controlling the HVAC system illustrated in FIG. 2 according to another exemplary embodiment of the present disclosure.

FIG. 6 illustrates a flowchart of a method for controlling the vehicle HVAC system 11 illustrated in FIG. 2. According to an exemplary embodiment illustrated in FIG. 6, the method may be performed in a condition in which a refrigerant is cooled using the water-cooled heat exchanger 70 in the vehicle HVAC system 11.

Referring to FIG. 6, it may be determined whether the compressor 32 of the vehicle HVAC system 11 operates (S51).

During the cooling operation of the vehicle HVAC system, the exterior heat exchanger 35 may serve as a condenser. The controller 1000 may determine whether a refrigerant passes through the exterior heat exchanger 35 serving as the condenser (S52). When the first three-way valve 61 is switched to close the inlet of the first refrigerant bypass conduit 25, the refrigerant may pass through the internal passage of the exterior heat exchanger 35 without passing through the first refrigerant bypass conduit 25. Accordingly, the controller 1000 may determine whether the refrigerant passes through the internal passage of the exterior heat exchanger 35 according to the switching operation of the first three-way valve 61.

The controller 1000 may determine whether the heating-side expansion valve 16 is fully opened (S53). During the cooling operation of the HVAC system 11, the opening degree of the heating-side expansion valve 16 may be 100%, and accordingly the refrigerant may pass through the heating-side expansion valve 16 without expansion of the refrigerant.

When the compressor 32 operates, the refrigerant passes through the exterior heat exchanger 35 serving as the condenser, and the heating-side expansion valve 16 is fully opened (that is, when it is determined in S53 that the heating-side expansion valve 16 is fully opened), the controller 1000 may monitor the state of the refrigerant using the temperature and pressure of the refrigerant measured by the refrigerant sensor (not shown) (S54-1).

When the compressor 32 does not operate, the refrigerant does not pass through the exterior heat exchanger 35, or the heating-side expansion valve 16 is not fully opened, the method according to this exemplary embodiment may end.

The controller 1000 may determine a target subcooled temperature of the refrigerant based on the temperature and pressure of the refrigerant discharged from the outlet of the compressor 32 (S54-2).

The controller 1000 may calculate a change in enthalpy of the refrigerant based on the determined target subcooled temperature in a process of condensing and subcooling the refrigerant (S54-3). Here, when the refrigerant flows from the outlet of the compressor 32 to the internal passage of the exterior heat exchanger 35, the enthalpy change of the refrigerant may be calculated by considering a change in a saturated temperature of the refrigerant according to a pressure drop of the refrigerant.

When the compressor 32 operates, the refrigerant passes through the exterior heat exchanger 35 serving as the condenser, and the heating-side expansion valve 16 is fully opened (that is, when it is determined in S53 that the heating-side expansion valve 16 is fully opened), the controller 1000 may receive a first RPM of each of the first battery-side pump 44 and/or the second battery-side pump 45, and the powertrain-side pump 54 from the external controllers 1100, 1200, and 1300 (S55-1). The first RPM may include at least one of the following: the RPM of the first battery-side pump 44 and/or the second battery-side pump 45 determined by the battery management system 1100; the RPM of the powertrain-side pump 54 determined by the powertrain controller 1200; and the RPM of each of the first battery-side pump 44 and/or the second battery-side pump 45, and the powertrain-side pump 54 determined by the vehicle controller 1300.

In addition, the controller 1000 may determine a second RPM of the first battery-side pump 44 and/or the second battery-side pump 45, and a second RPM of the powertrain-side pump 54 (S55-1). The second RPM may be determined by considering a flow rate of a battery-side coolant, a flow rate of a powertrain-side coolant, overload of each of the pumps 44, 45, and 54, and the like.

The controller 1000 may determine whether the first RPM is less than or equal to the second RPM (S55-2).

When it is determined in S55-2 that the first RPM is less than or equal to the second RPM, the controller 1000 may calculate a change in enthalpy of the coolant passing through the water-cooled heat exchanger 70 (a change in enthalpy of the battery-side coolant and a change in enthalpy of the powertrain-side coolant) based on the second RPM (S55-3 and S56).

When it is determined in S55-2 that the first RPM exceeds the second RPM, the controller 1000 may calculate a change in enthalpy of the coolant passing through the water-cooled heat exchanger 70 (a change in enthalpy of the battery-side coolant and a change in enthalpy of the powertrain-side coolant) based on the first RPM (S55-4 and S56).

In other words, the controller 1000 may calculate the enthalpy change of the battery-side coolant and the enthalpy change of the powertrain-side coolant based on the higher RPM of the first RPM determined by the external controllers 1100, 1200, and 1300 and the second RPM determined by the controller 1000. As the flow rate of the coolant passing through the water-cooled heat exchanger 70 increases, the amount of the refrigerant condensed by the water-cooled heat exchanger 70 may be relatively increased compared to the amount of the refrigerant condensed by the exterior heat exchanger 35, and thus a required fan duty of the cooling fan 75 for achieving the subcooling of the refrigerant by the exterior heat exchanger 35 may be relatively reduced.

The controller 1000 may calculate a change in enthalpy of air passing over the exterior surface of the exterior heat exchanger 35 based on the calculated refrigerant enthalpy change, the calculated battery-side coolant enthalpy change, and the calculated powertrain-side coolant enthalpy change (S57). Specifically, the enthalpy change of the air may be calculated based on a temperature difference between the refrigerant and the air, a specific heat of the air, a flow rate of the refrigerant passing through the exterior heat exchanger 35, and the like.

The controller 1000 may monitor a vehicle speed and an opening degree of the grille 14 (S58). The vehicle speed may be received from the vehicle controller 1300, and the opening degree of the grille 14 may be adjusted by the active air flap 14a. A flow rate of the air passing over the exterior surface of the exterior heat exchanger 35 may be calculated based on the vehicle speed and the opening degree of the grille 14.

The controller 1000 may calculate a required fan duty of the cooling fan 75 based on the calculated air enthalpy change, the vehicle speed, and the opening degree of the grille 14 (S59). Here, the required fan duty of the cooling fan 75 refers to a fan duty optimized to meet the target subcooled temperature of the refrigerant.

The controller 1000 may operate the cooling fan 75 according to the calculated required fan duty (S60).

Then, the controller 1000 may determine whether the compressor 32 is stopped (S61). When the compressor 32 is not stopped, the method according to this exemplary embodiment may return to S54-1.

As set forth above, the method for controlling the vehicle HVAC system according to exemplary embodiments of the present disclosure may accurately calculate the required fan duty of the cooling fan which matches the subcooling of the refrigerant based on the refrigerant enthalpy change, the air enthalpy change, and the like, thereby achieving sufficient subcooling of the refrigerant and reducing power consumption during the operation of the HVAC system.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for controlling a heating, ventilation, and air conditioning (HVAC) system of a vehicle, the method comprising:
   determining a target subcooled temperature of a refrigerant based on a temperature and a pressure of the refrigerant discharged from an outlet of a compressor when the compressor operates;
   calculating a change in enthalpy of the refrigerant based on the determined target subcooled temperature in a process of condensing and subcooling the refrigerant;
   calculating a change in enthalpy of air passing over an exterior surface of a condenser based on the calculated refrigerant enthalpy change; and
   calculating a required fan duty of a cooling fan based on the calculated air enthalpy change, wherein the cooling fan is configured to blow the air to the condenser.

2. The method according to claim 1, wherein the air enthalpy change is calculated based on a temperature difference between the refrigerant and the air, a specific heat of the air, or a flow rate of the refrigerant.

3. The method according to claim 1, further comprising monitoring a speed of the vehicle and an opening degree of a grille.

4. The method according to claim 3, wherein the required fan duty of the cooling fan is calculated based on the speed of the vehicle, the opening degree of the grille, and the calculated air enthalpy change.

5. The method according to claim 1, further comprising:
   preliminarily cooling and condensing the refrigerant using a coolant passing through a heat exchanger located on an upstream side of the condenser; and
   calculating a change in enthalpy of the coolant based on an RPM of a pump of a cooling system;
   wherein the HVAC system is thermally connected to the cooling system through the heat exchanger; and
   the required fan duty of the cooling fan is calculated based on the calculated coolant enthalpy change and the calculated air enthalpy change.

6. The method according to claim 5, wherein the coolant enthalpy change is calculated based on a higher RPM of a first RPM determined by an external controller and a second RPM determined by the controller.

7. The method according to claim 1, wherein the HVAC system comprises an evaporator, a heater core, an air mixing door, an expansion valve connected to an inlet of the evaporator, the compressor connected to an outlet of the evaporator, and the condenser connected to an outlet of the compressor.

8. The method according to claim 1, wherein the vehicle comprises an electric vehicle, and wherein the HVAC system comprises an evaporator, the compressor, an interior condenser, a heating-side expansion valve, a water-cooled heat exchanger, an exterior heat exchanger, and a cooling-side expansion valve.

9. The method according to claim 8, wherein the HVAC system is thermally connected to a battery cooling system through a battery chiller and the water-cooled heat exchanger.

10. The method according to claim 9, wherein the HVAC system is thermally connected to a powertrain cooling system through the water-cooled heat exchanger.

11. A method for controlling a heating, ventilation, and air conditioning (HVAC) system for a vehicle, the method comprising:
determining whether a compressor operates, a refrigerant passes through an exterior heat exchanger, and a heating-side expansion valve is fully opened;
in response to a determination that the compressor operates, the refrigerant passes through the exterior heat exchanger, and the heating-side expansion valve is fully opened, determining a target subcooled temperature of the refrigerant based on a temperature and a pressure of the refrigerant discharged from an outlet of the compressor;
calculating a change in enthalpy of the refrigerant based on the determined target subcooled temperature;
calculating a change in enthalpy of air passing over an exterior surface of a condenser based on the calculated refrigerant enthalpy change;
calculating a required fan duty of a cooling fan based on the calculated air enthalpy change; and
operating the cooling fan to blow the air to the condenser based on the calculated fan duty.

12. The method according to claim 11, wherein the air enthalpy change is calculated based on a temperature difference between the refrigerant and the air, a specific heat of the air, or a flow rate of the refrigerant.

13. The method according to claim 11, further comprising monitoring a speed of the vehicle and an opening degree of a grille.

14. The method according to claim 13, wherein the required fan duty of the cooling fan is calculated based on the speed of the vehicle, the opening degree of the grille, and the calculated air enthalpy change.

15. The method according to claim 11, further comprising:
preliminarily cooling and condensing the refrigerant using a coolant passing through the exterior heat exchanger located on an upstream side of the condenser; and
calculating a change in enthalpy of the coolant based on an RPM of a pump of a cooling system;
wherein the HVAC system is thermally connected to the cooling system through the exterior heat exchanger; and
the required fan duty of the cooling fan is calculated based on the calculated coolant enthalpy change and the calculated air enthalpy change.

16. The method according to claim 15, wherein the coolant enthalpy change is calculated based on a higher RPM of a first RPM determined by an external controller and a second RPM determined by the controller.

17. A heating, ventilation, and air conditioning (HVAC) system for a vehicle, the HVAC system comprising:
a compressor;
a condenser coupled to the compressor;
a cooling fan configured to blow air to the condenser; and
a controller configured to:
determine a target subcooled temperature of a refrigerant based on a temperature and a pressure of the refrigerant discharged from an outlet of the compressor;
calculate a change in enthalpy of the refrigerant based on the determined target subcooled temperature in a process of condensing and subcooling the refrigerant;
calculate a change in enthalpy of air passing over an exterior surface of the condenser based on the calculated refrigerant enthalpy change; and
calculate a required fan duty of the cooling fan based on the calculated air enthalpy change.

18. The HVAC system according to claim 17, wherein the controller is configured to calculate the air enthalpy change based on a temperature difference between the refrigerant and the air, a specific heat of the air, or a flow rate of the refrigerant.

19. The HVAC system according to claim 17, wherein the controller is further configured to monitor a speed of the vehicle and an opening degree of a grille.

20. The HVAC system according to claim 19, wherein the controller is further configured to calculate the required fan duty of the cooling fan based on the speed of the vehicle, the opening degree of the grille, and the calculated air enthalpy change.

* * * * *